Jan. 19, 1954  R. S. DART  2,666,513
LINE DIVIDING MECHANISM FOR CONVEYERS
Filed Aug. 23, 1950  2 Sheets-Sheet 1
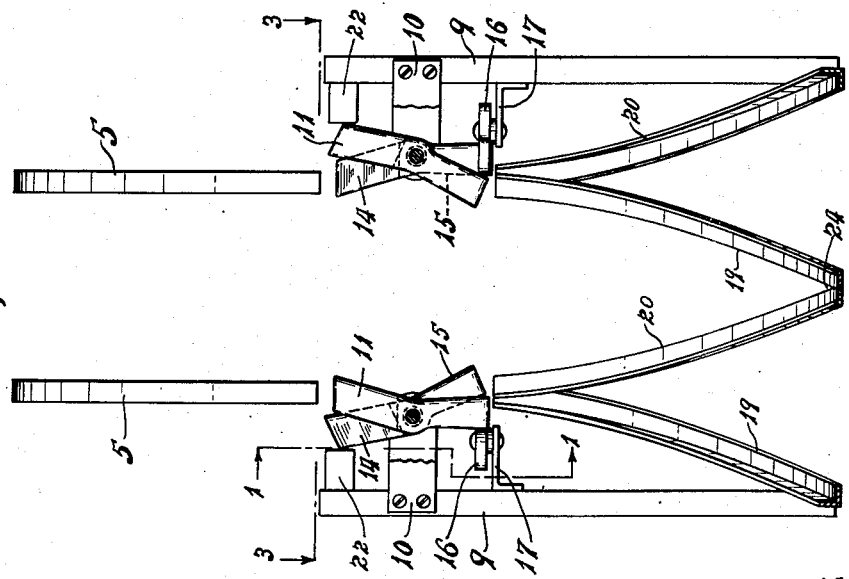
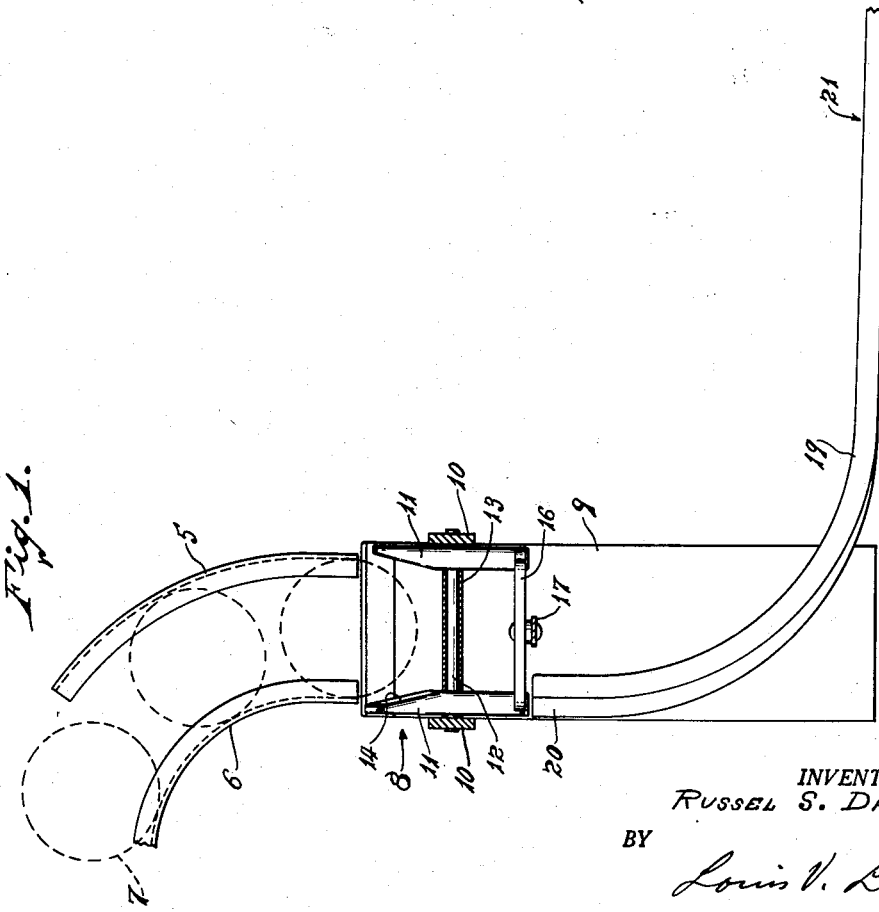
INVENTOR.
RUSSEL S. DART
BY
*Louis V. Lucia*
ATTORNEY

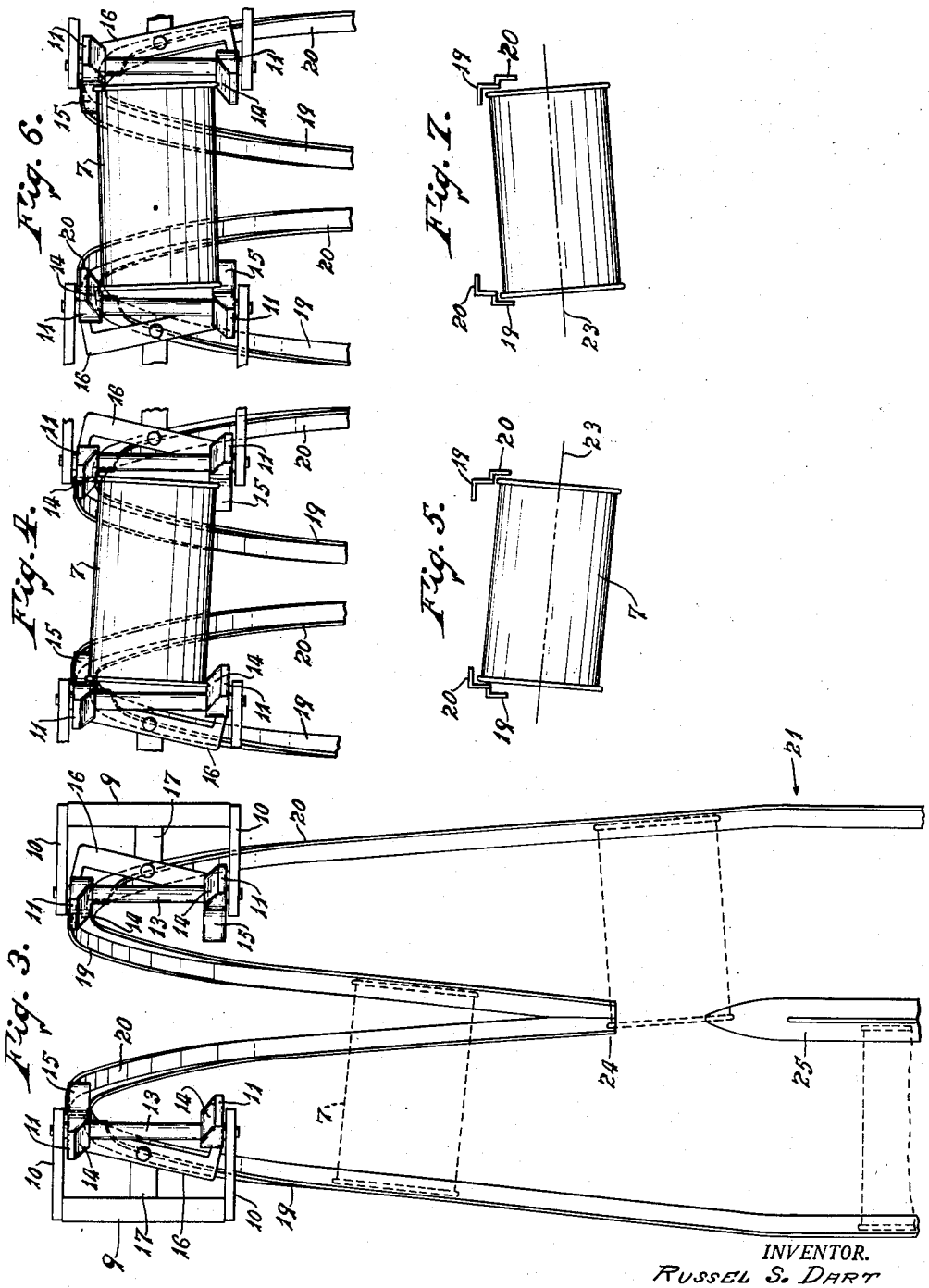

Patented Jan. 19, 1954

2,666,513

UNITED STATES PATENT OFFICE 2,666,513

LINE DIVIDING MECHANISM FOR CONVEYERS

Russel S. Dart, Middle Haddam, Conn.

Application August 23, 1950, Serial No. 180,967

11 Claims. (Cl. 193—39)

This invention relates to a line dividing mechanism for conveyors.

Devices have heretofore been provided for dividing lines or rows of articles, such as cans or the like, while moving forwardly on a conveyor, so as to guide or direct the articles onto a plurality of separate tracks or conveyors but such devices have required, for their operation, a substantial amount of force which has interfered with and retarded the forward movement of the articles.

It is an object of the present invention, therefore, to provide a mechanism for dividing a single row of articles into a plurality of separate rows while the said articles are moving on a conveyor and without materially retarding their forward movement.

It is a further object of this invention to provide a mechanism which will operate to divide single cans or the like into separate rows with a minimum requirement of energy so as to thereby prevent a retarding action upon the movement of the cans and permit maximum speed in the forward movement of said cans or other like articles.

It is a still further object of the invention to provide a simple and efficient mechanism for dividing the cans to divert them into separate guides or tracks by applying to the can a slight rotational movement.

A still further object of the invention is the provision of a simple and efficient mechanism which is operable entirely by the article while it is being moved by gravity.

Further objects and advantages of this invention will be more clearly understood from the following description and from the accompanying drawings in which:

Fig. 1 is a sectional side view, on line 1—1 of Fig. 2, of a portion of a conveyor apparatus which includes my improved dividing mechanism.

Fig. 2 is a front view of said apparatus.

Fig. 3 is a plan view, on line 3—3 of Fig. 2, of said apparatus and my improved divider mechanism, showing the said mechanism in one position.

Fig. 4 is a similar view showing a can in position as it is being rotated by said mechanism and guided into one of the separate conveyors.

Fig. 5 is a diagrammatical plan view showing the said can as it enters the said conveyor from the position illustrated in Fig. 4.

Fig. 6 is a view similar to Fig. 4 but showing the position of the following can as it is guided by the mechanism into the other separate conveyor.

Fig. 7 is a diagrammatical plan view showing the said can as it enters the separate conveyor from the position illustrated in Fig. 6.

In the embodiment of my invention, which is illustrated in the drawings, the numerals 5 and 6 denote pairs of upper and lower tracks of a conventional conveyor of the type commonly used for conveying such articles as cans, indicated at 7. In the conveyor illustrated, the tracks 5 and 6 may convey the cans from any desired location and said tracks are curved downwardly, as illustrated in Fig. 1, so as to drop a continuous line of the cans, by gravity, into the dividing mechanism which is generally illustrated at 8.

The said dividing mechanism preferably comprises a frame consisting of upright supports 9—9 having supporting bars 10—10 extending therefrom and between which is pivotally mounted a pair of opposed switching members. Each pair of said switching members consists of left and right elongated members 11—11 that are pivotally mounted upon a shaft 12 that extends between the supporting bars 10—10. The said members are spaced upon said shaft by a sleeve 13.

Each of said members 11—11 consists of an elongated bar having a tapered switching surface 14 and a cam surface 15, both of which surfaces are opposed to the cooperating surfaces of the opposite member of each pair. The said switching members of each pair are operatively connected by a reversing bar 16 which is pivoted upon a support 17 that extends from the upright supports 9.

As illustrated in Fig. 2, it will be noted that each pair of said members 11—11 is operated by its respective bar 16 so that it will be located in a position opposite to that of the cooperating pair of said members at the opposite side of the conveyor and thereby present the switching surface 14 to engage the diagonally opposite edges of a can, as illustrated in Figs. 4 to 7, and cause rotation of said can during its movement, as will be hereafter more fully described.

In the embodiment shown, the conveyor consisting of the upper tracks 5 and 6 is continued into divided pairs of tracks 19—19 and 20—20 which extend downwardly from a point below the dividing mechanism and are curved into a horizontally disposed portion 21, such as clearly shown in Fig. 1.

If desired, stop bars 22—22 may be provided on the frame for limiting the movement of the switch members 11—11 and thereby locating them in their correct position to be properly engaged by the falling cans as they pass through the said dividing mechanism.

In the operation of the embodiment of my invention which is illustrated in the drawings, the cans 7 move forwardly by rolling in close succession down the inclined upper conveyor between the tracks 5 and 6. As they reach the downwardly curving portion of said upper conveyor, the cans gravitationally drop vertically through the said dividing mechanism. As they pass through said mechanism, the diagonally opposite edges of the can engage the switching surfaces 14 of the diagonally opposite switching members 11—11, as clearly illustrated in Fig. 4, and said surfaces then apply a slight twisting or rotating motion to the can about its vertical axis as it moves downwardly by its own weight. This causes the can to be aligned with the cooperating conveyor tracks 20—20 below the dividing mechanism, as shown in Fig. 4, and, as the can drops, it leaves the said switching surfaces and engages the cam surfaces 15 of the opposed diagonally opposite switching members and causes said members to rock on their shafts 12 and, through their cooperating reversing bars 16, cause the said pairs of switching members to be reversed in their respective positions, as shown in Fig. 6, from their previous position shown in Fig. 4. The following can which drops through the said switching mechanism will then engage the switching surfaces 14 of the opposite diagonally disposed switching members, as shown in Fig. 6, and cause said can to be twisted into alignment with tracks 19—19 so that, after it passes through the switching mechanism it will drop into said track and roll down its incline onto a continuing conveyor which is separated from the conveyor that continues from the tracks 20—20.

It will be understood that, as each can falls through the dividing mechanism into one of the separate conveyors, it automatically sets the diagonally opposite switching members in position to switch the following can onto the other separate conveyor.

By positioning my improved dividing mechanism, so that the switching members 11—11 thereof are operated by the movement of each succeeding can as it falls through said mechanism under its own weight, the operation of said dividing mechanism is caused at a time when the falling can is moving ahead faster than the following can and the slight amount of energy required to rotate the can on its axis and reverse the said switching members permits them to be operated by the falling can without retarding its forward movement sufficiently to effect the movement of the line of cans in the upper portion of the conveyor and between the tracks 5 and 6.

From the illustrations in Figs. 5 and 7 it will be noted that the tracks 19—19 and 20—20 are on planes parallel with the longitudinal axis 23 of the can which they receive after the said can has been twisted by the switching mechanism so that, after a can drops into one of said tracks, the following can will drop into the other track and the said line of cans in the upper conveyor will thereby be divided into two separate lines of cans in the conveyors continuing from the tracks 19—19 and 20—20.

It will also be noted that, as illustrated in Fig. 3, the inner rails of said tracks 19—19 and 20—20 converge, as at 24, so as to guide the cans onto opposite sides of a single two-sided rail 25 which forms the dividing line between the lower extensions of the said tracks.

As the cans roll down the inclined portion of each of the tracks, they cross to opposite sides of the single two-sided rail 25 and the side flanges of the converging rails of the tracks are tapered off towards the point of their convergence to a height less than the height of the flanges on the cans 7 in order to prevent interference with the bodies of the cans as they roll over said side flanges.

From the above description it will be understood that my improved dividing mechanism will operate to switch alternate cans from a continually moving line of cans into separate tracks or conveyors and that the switching operation is performed by a slight rotational movement of the can about its axis by contact with the diagonally opposed switching surfaces 14 of the cooperating switching members in the switching mechanism as the said cans fall by gravity.

I claim:

1. An article conveyor including a conveyor track on which a line of said articles is conveyed, a plurality of separate tracks continuing from said conveyor track and a dividing mechanism between said conveyor track and separate tracks; the said mechanism comprising opposite pairs of opposed switching members, switching surfaces on said members for engaging diagonally opposite portions of an article passing through said dividing mechanism to cause rotation of the said article into registering position with one of said separate tracks, cam surfaces on said switching members engageable by said article for shifting said switching members into position to be engaged by a succeeding article for rotating said article into registering position with another of said separate tracks, and means for interconnecting the said shifting members of each pair to cause reversal of their relative positions as they are operated by said articles.

2. A dividing mechanism as set forth in claim 1, wherein the switching surfaces on the switching members are engaged by diagonally opposite side portions of the article, to cause rotation thereof into registering position with one of the separate tracks, and the cam surfaces on said switching members are engageable by diagonally opposite end portions of the article for shifting the said switching members into position to be engaged by the succeeding article.

3. A mechanism for dividing a line of articles into separate lines; the said mechanism including two pairs of opposed switching members, each of said pairs including oppositely disposed elongated bars pivotally mounted on a supporting shaft and spaced from each other, a switching surface on each of the said bars engageable by an article moving through said mechanism and adapted to move said article into one separate line, a cam surface on each of said bars engageable by said article and adapted to reverse the position of the bar to present the switching surface thereon in the path of the directly following article for switching said article into another separate line, and reversing means operable by each of said bars for reversing the position of the opposite bar in a respective pair to present the switching surface of said opposite bar in the path of the next article.

4. A mechanism as set forth in claim 3, wherein the switching surfaces are engaged by diagonally opposite side portions of the article and the reversing means include cam surfaces engageable by diagonally opposite end portions of the article.

5. A mechanism for dividing a line of articles into separate lines; said mechanism including two pairs of switching members, each pair of said switching members including oppositely disposed pivotally mounted elongated bars, a reversing bar interconnecting said elongated bars, each of said elongated bars having a switching surface adapted to engage diagonally opposite corner portions of said article and cause a slight rotational movement of the article whereby it is positioned in register with a conveyor, and a cam surface on each of said bars engageable with the article during falling movement thereof through said mechanism for reversing the relative positions of said bars to present the switching surfaces of the opposite bars in the path of the directly following article for moving said article into registering position with a separate conveyor.

6. A mechanism as set forth in claim 5, wherein the switching surfaces are engageable by diagonally opposite side surfaces adjacent the corners of the article and the cam surfaces are engageable by diagonally opposite end portions adjacent the corners of the article.

7. A mechanism for dividing a line of articles from a single conveyor onto a plurality of separate conveyors; the said mechanism comprising a frame, switching means supported on said frame and positioned below said single conveyor in the path of articles passing therefrom, a plurality of separate conveyors positioned below said switching means, a pair of switching members at each side of said separate conveyors, including opposed switching bars pivotally mounted on said frame and each having a switching surface for applying a rotational movement to the article as it moves through said dividing mechanism and a cam surface engageable by the said article for shifting said bars to present the switching surfaces thereof in the path of the following article, and a reversing bar pivotally mounted on said frame and operable by either of said switching bars to reverse the position of the other bar, the switching surfaces of the two bars which are diagonally disposed being operable to rotate an article in one direction to move it into register with one of said separate conveyors and the switching surfaces of the opposite diagonally disposed bars being operable to rotate the directly following article in the opposite direction to move it into register with the other of said separate conveyors.

8. A mechanism for dividing a line of articles from a single conveyor onto a plurality of separate conveyors; the said mechanism comprising a frame, four switching members on said frame in position to engage the corners of an article passing from said single conveyor, each of said switching members comprising a vertically disposed bar pivotally mounted on said frame and having an upper portion with a switching surface thereon and a lower portion with a cam surface, the switching surfaces of the two diagonally opposite switching members being positioned to engage the corresponding corners of said article and apply a slight rotational movement to the article to thereby place it in register with a separate conveyor below said mechanism, the lower portions of the other diagonally opposite switching members being disposed to be engaged by the moving article to shift said members to move the switching surfaces thereof into the path of the following falling article whereby as an article passes from the single conveyor, it is given a slight rotational movement and thereby brought into register with one of the separate conveyors and the following falling article is given a slight rotational movement in the opposite direction and thereby brought into register with another separate conveyor.

9. A mechanism for dividing a line of articles from a single conveyor onto a plurality of separate conveyors, said mechanism being located in the path of articles passing from the single conveyor and including a frame, two pairs of switching members located in position to engage the corner portions of articles passing from said single conveyor, each of said switching members comprising a vertically disposed bar pivotally mounted on said frame and having an upper portion and a lower portion at opposite sides of the pivotal fulcrum thereof, the upper portion of each of said bars having a laterally and downwardly inclined switching surface adapted to engage a corner of an article and a cam surface on the lower portion extending inwardly in said mechanism from the pivotal axis of said switching member, means for reversing the relative positions of said switching members, stop means for positioning said members, and separate conveyors below said mechanism diverging from points at equal radial distances from the axis of the article as it passes from the single conveyor.

10. In an apparatus adapted for dividing a line of articles, the combination of a conveyor for said articles having a downwardly opening end portion from which the articles drop, a dividing device disposed below the said end portion in position to receive the articles as they drop from the conveyor, means in said device for alternately applying a slight rotational movement to said articles on a horizontal plane and in opposite directions to thereby alternately place said articles in different positions during their movement through the said device, and a plurality of separate conveyors positioned below the said device and each adapted to receive the articles as they drop from one of said positions.

11. A mechanism for dividing a line of articles as set forth in claim 10, wherein the separate conveyors comprise a plurality of tracks each having vertically disposed end portions positioned below the dividing device at a different angle thereto to receive the articles from one of the positions into which they are rotated by said device.

RUSSEL S. DART.

References Cited in the file of this patent

UNITED STATES PATENTS

| Number | Name | Date |
|---|---|---|
| 1,062,379 | Anderson et al. | May 20, 1913 |
| 1,068,729 | Bjorkholm | July 29, 1913 |
| 1,236,389 | Augensen | Aug. 14, 1917 |